US009383748B2

(12) United States Patent
Oreyang

(10) Patent No.: US 9,383,748 B2
(45) Date of Patent: Jul. 5, 2016

(54) FORWARD TRACKING SYSTEM AND CONTROL METHOD THEREOF

(71) Applicant: ACROX TECHNOLOGIES CO., LTD., Taipei (TW)

(72) Inventor: Yia-Yuan Oreyang, Taipei (TW)

(73) Assignee: ACROX TECHNOLOGIES CO., LTD., Taipei (TW)

( * ) Notice: Subject to any disclaimer, the term of this patent is extended or adjusted under 35 U.S.C. 154(b) by 142 days.

(21) Appl. No.: 14/288,408

(22) Filed: May 28, 2014

(65) Prior Publication Data
US 2015/0346720 A1    Dec. 3, 2015

(51) Int. Cl.
*G01C 21/00*    (2006.01)
*G05D 1/00*    (2006.01)
*G01S 15/08*    (2006.01)
*G01S 15/02*    (2006.01)
*G01S 3/782*    (2006.01)
*G01S 15/88*    (2006.01)

(52) U.S. Cl.
CPC ............. *G05D 1/0011* (2013.01); *G01S 3/782* (2013.01); *G01S 15/025* (2013.01); *G01S 15/08* (2013.01); *G01S 15/88* (2013.01)

(58) Field of Classification Search
CPC ............................. G01S 15/08; G05D 1/0011
USPC ............................................................ 701/2
See application file for complete search history.

*Primary Examiner* — Maceeh Anwari
(74) *Attorney, Agent, or Firm* — Leong C. Lei

(57) ABSTRACT

The forward tracking system contains a moving carrier and a remote control device. The moving carrier contains a control module, a frame, and at least a driving unit. The control module directs the driving unit to move or turn the moving carrier. The frame has a first and a second IR (infra-red) receivers to detect the user's turning left or right, and a first supersonic detector to detect a distance from the user. The remote control device contains at least an IR transmitter signally linked to the first and second IR receivers. When a user is in front of the moving carrier, the first and second IR receivers, and the first supersonic detector provide lateral movement and forward distance detection, so that the moving carrier automatically follows the user at a constant distance behind as the user moves straight ahead, or turns left or right.

9 Claims, 4 Drawing Sheets

FORWARD TRACKING SYSTEM AND CONTROL METHOD THEREOF

BACKGROUND OF INVENTION (a) Technical Field of the Invention

The present invention is generally related to automatic control systems, and more particular to a forward tracking system and a related method where a moving carrier follows a user at a constant distance behind as the user moves or turns.

(b) Description of the Prior Art

Robots have already been widely applied in various industries and disciplines such as military operations, rescue missions, electronic industry, automobile industry, etc., to replace or to assist human operators in tasks requiring high precision or involving significant hazard.

As technology advances, robots are also applied to human daily lives such as the floor automatic vacuum cleaner or the wired or wireless automatic carrier for transporting stuffs. For the latter, usually it has to be operated in a pre-determined environment, and usually a path is pre-arranged. The automatic carrier detects the path and then follows the path to move around. Therefore, this kind of the moving carrier has limited applicability.

On the other hand, automatic carriers that can follow people to move around are also developed. These automatic carriers usually employ a supersonic detector to detect distance so as to maintain a constant distance as the carriers follow the users. For these automatic carriers, the users usually can only move straight ahead. If the users turn left or right, the automatic carriers usually cannot respond in time and as such fail to follow up.

SUMMARY OF THE INVENTION

To obviate the above-described shortcoming, the present invention teaches a novel forward tracking system, which contains a moving carrier and a remote control device. The moving carrier contains a control module, a frame, and at least a driving unit. The driving unit is configured in the moving carrier and electrically connected with the control module. The control module directs the driving unit to move or turn the moving carrier. The frame is configured on the moving carrier, and has a first and a second IR (infra-red) receivers to detect the user's turning left or right, and a first supersonic detector to detect a distance from the user. The remote control device contains at least an IR transmitter signally linked to the first and second IR receivers.

A related control method is also provided by the present invention.

According the forward tracking system and method, when a user is in front of the moving carrier, the first and second IR receivers, and the first supersonic detector provide lateral movement and forward distance detection, so that the moving carrier automatically follows the user at a constant distance behind as the user moves straight ahead, or turns left or right.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
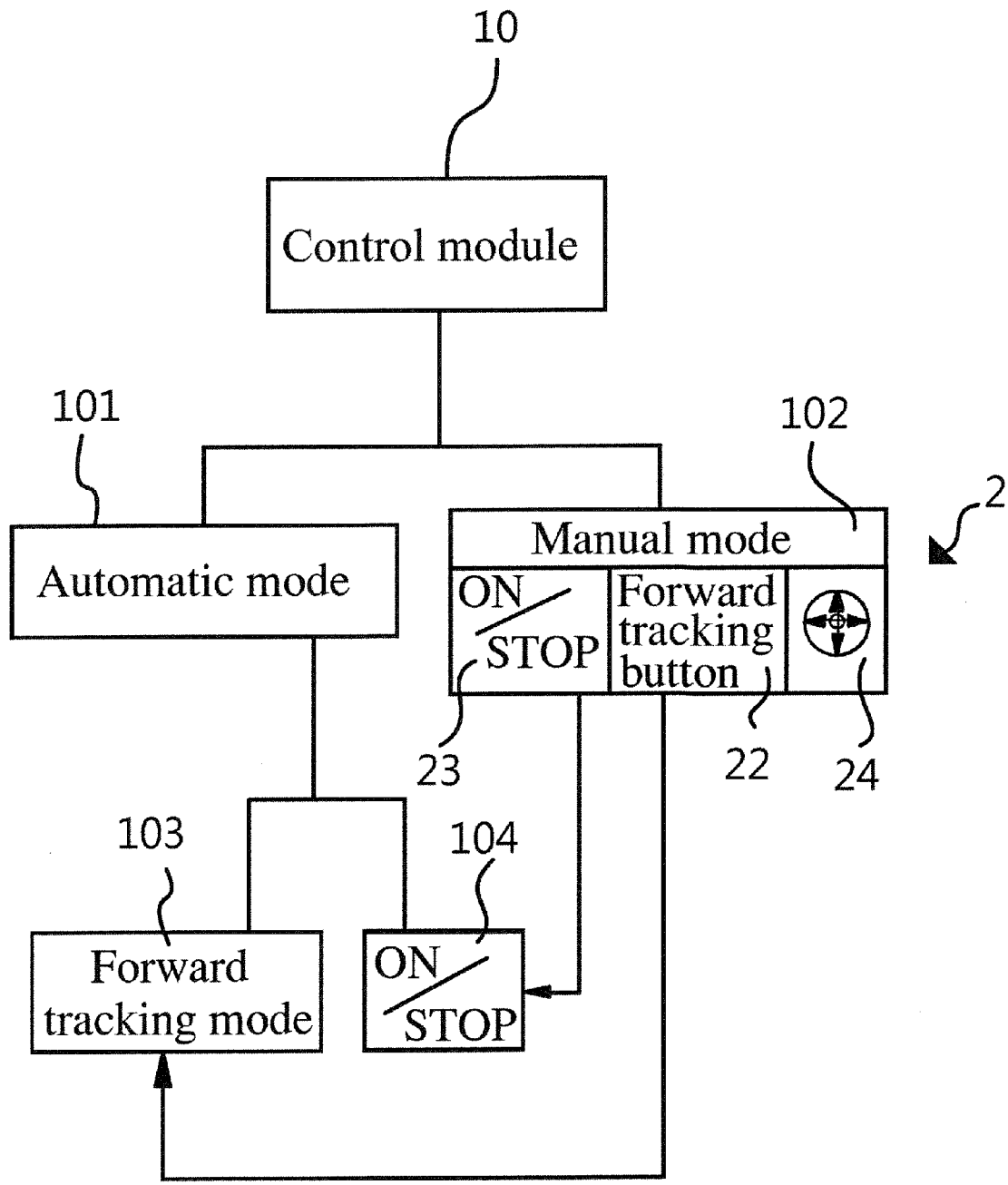
FIG. 1 is a schematic diagram showing a control logic of a forward tracking system according to an embodiment of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1 to 4, a forward tracking system according to an embodiment of the present invention contains a moving carrier 1 and a remote control device 2.

The moving carrier 1 contains a control module 10, a frame 11, and at least a driving unit 12.

The control module 10 is configured inside the moving carrier 1. The control module 10 operates in an automatic mode 101 or in a manual mode 102 controlled by the remote control device 2. The automatic mode 101 can be further configured to be a forward tracking mode 103, or an ON/STOP mode 104 to toggle between an ON or STOP state of the moving carrier 1.

The frame 11 is configured on the moving carrier 1. A first IR (infra-red) receiver 111 is configured adjacent to a first lateral side of the frame 11, and a second IR receiver 112 is configured adjacent to a second lateral side of the frame 11. A first supersonic detector 113 is configured between the first and second IR receivers 111 and 112. The first and second IR receivers 111 and 112, and the first supersonic detector 113 are electrically connected with the control module 10 which receives feedback signals from the first and second IR receivers 111 and 112, and the first supersonic detector 113, processes the feedback signals, and produces a control signal to the driving unit 12.

The driving unit 12 is configured in the moving carrier 1 and electrically connected with the control module 10. The control signal produced by the control module 10 directs the driving unit 12 to move forward, to turn left, or to turn right. The driving unit 12 drives the moving carrier's wheels or tracks. The moving carrier 1 further contains at least a battery module providing the required electricity to the driving unit 12 and the control module 10.

The remote control device 2 contains at least an IR transmitter 21. The remote control device 2 and the control module 10 are configured with an identification code. After an authentication process based on the identification code between the remote control device 2 and the control module 10 is successfully finished, the IR transmitter 21 of the remote control device 2 is linked to the first and second IR receivers 111 and 112. The remote control device 2 further contains at least a forward tracking button 22, a toggle button 23, and a number of direction control buttons 24.

The present invention also provides a control method for the forward tracking system, which contains the following steps.

In step 100, the control module 10 is set to operate in the automatic mode 101 or in the manual mode 102 controlled by the remote control device 2.

In step 110, if the automatic mode 101 is set, the control module 10 is further set to operate in the forward tracking mode 103, or is set to the ON/STOP mode 104.

In step 120, if the forward tracking mode 103 is set, the first and second IR receivers 111 and 112, and the first supersonic detector 113 on the frame 11 of the moving carrier 1 are all activated. For a user straight ahead the moving carrier 1, the first and second IR receivers 111 and 112 detect the user's left and right moving directions whereas the first supersonic detector 113 detects a forward distance between the user and the moving carrier 1. As such, the control module 10 is able to automatically control the moving carrier 1 to follow the user at a constant distance (e.g., 2 to 3 meters) behind.

In step 130, if the control module 10 is set to the ON/STOP mode 104 to toggle between an ON or STOP state of the moving carrier 1, the moving carrier 1 is set to the ON (i.e., activated) state if it is currently in the STOP (i.e., deactivated) state, or the moving carrier 1 is set to the STOP state if it is currently in the ON state.

In step 140, if the manual mode 102 is set, the remote control device 2 is used to manually control the moving carrier 1 using the forward tracking button 22, toggle button 23, and direction control buttons 24.

In step 150, if the forward tracking button 22 is activated, the first and second IR receivers 111 and 112, and the first supersonic detector 113 on the frame 11 of the moving carrier 1 are all activated. For a user straight ahead the moving carrier 1, the first and second IR receivers 111 and 112 detect the user's left and right moving directions whereas the first supersonic detector 113 detects a forward distance between the user and the moving carrier 1. As such, the control module 10 then is able to automatically control the moving carrier 1 to follow the user at a constant distance (e.g., 2 to 3 meters) behind.

In step 160, if the toggle button 23 is activated, the moving carrier 1 is set to the ON state if it is currently in the STOP state, or the moving carrier 1 is set to the STOP state if it is currently in the ON state.

In step 170, if any one of the direction control buttons 24 is activated, the moving carrier 1 is manually controlled by the user through the remote control device 2 to move in the direction specified by the activated direction control button 24.

Figure 2:
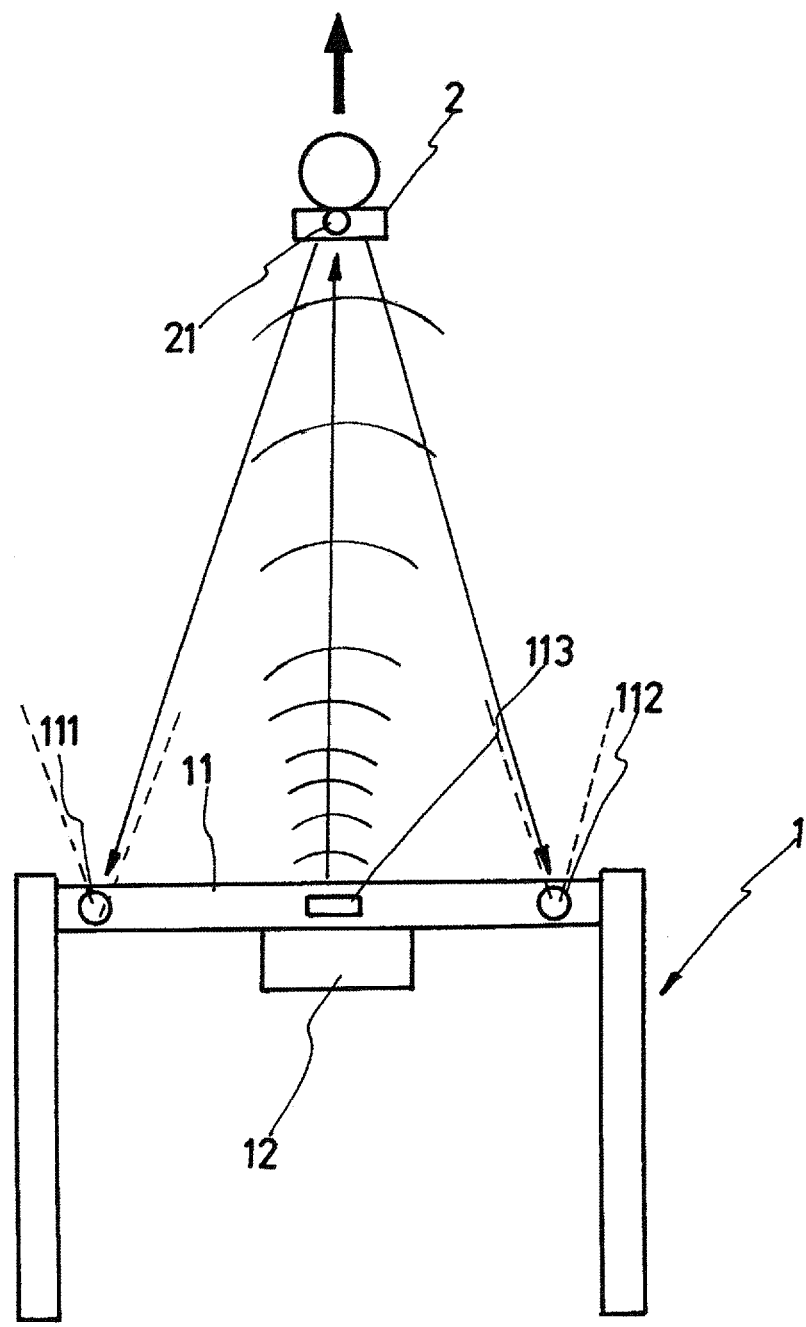
FIG. 2 is a schematic diagram showing a moving carrier of the forward tracking system of FIG. 1 follows a user as the user moves straight forward.
Figure 3:
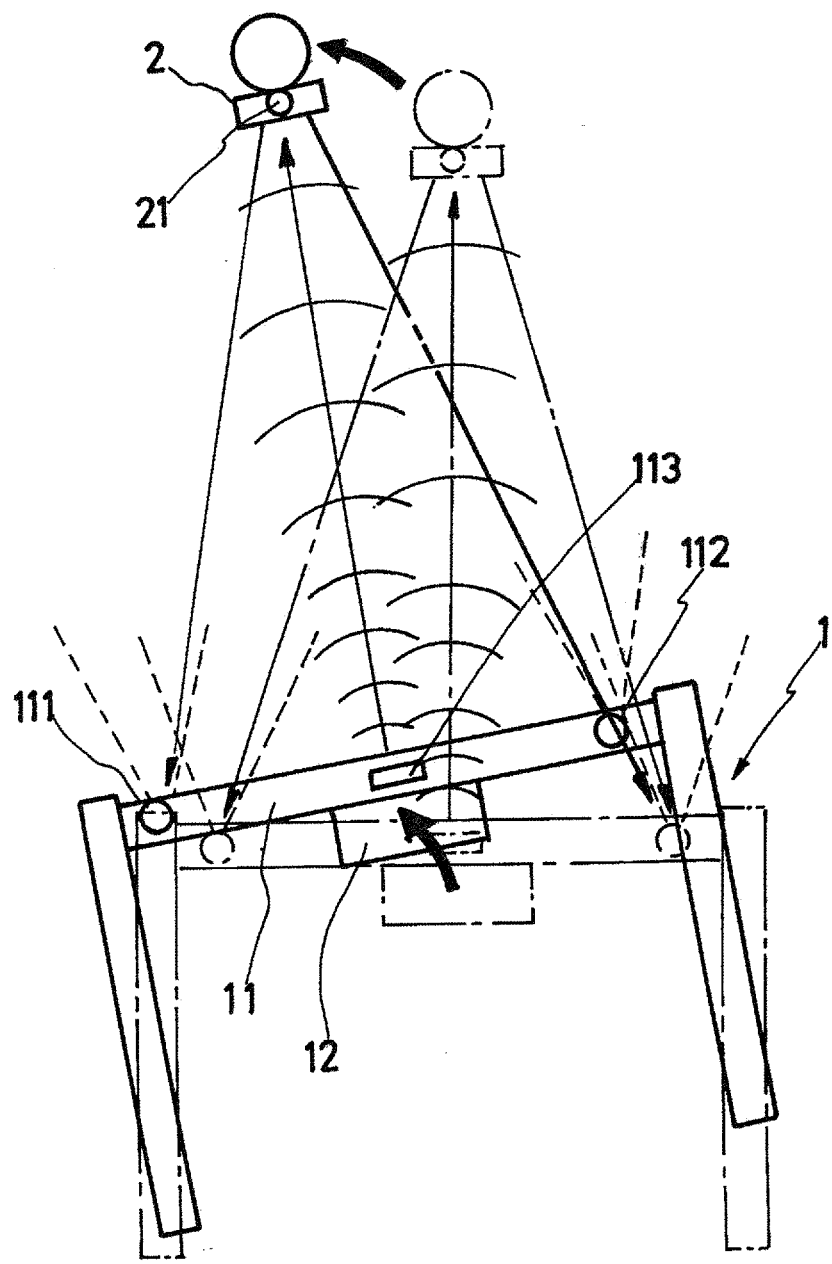
FIG. 3 is a schematic diagram showing a moving carrier of the forward tracking system of FIG. 1 follows a user as the user turns left.
Figure 4:
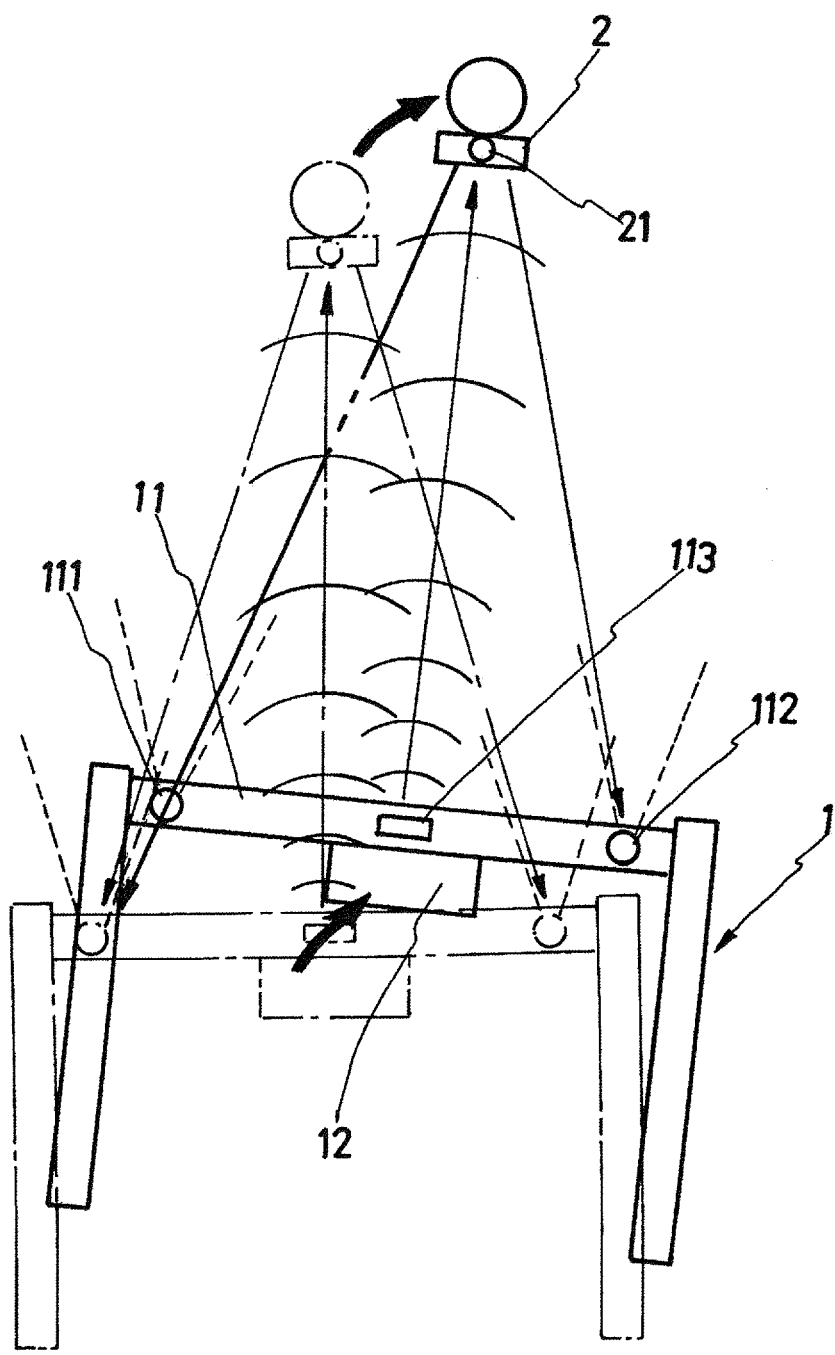
FIG. 4 is a schematic diagram showing a moving carrier of the forward tracking system of FIG. 1 follows a user as the user turns right.

In the above described forward tracking mode 103, the user carries the remote control device 2 and moves ahead of the moving carrier 1 (as shown in FIG. 2). The IR transmitter 21 of the remote control device 2 emits an IR signal. If the IR signal is received by both the first and second IR receivers 111 and 112, the control module 10 determines that the user is moving straight ahead the moving carrier 1, and instructs the driving unit 12 to drive the moving carrier 1 to move straight ahead. When the user turns to the first lateral side (e.g., left side as shown in FIG. 3), the second IR receiver 112 does not receive the IR signal from the IR transmitter 21 (the reason will be given below). The control module 10 therefore determines that the user has turned to the first lateral side, and instructs the driving unit 12 to drive the moving carrier 1 to move towards the first lateral side. Similarly, when the user turns to the second lateral side (e.g., right side as shown in FIG. 4), the first IR receiver 111 does not receive the IR signal from the IR transmitter 21 (the reason will be given below). The control module 10 therefore determines that the user has turned to the second lateral side, and instructs the driving unit 12 to drive the moving carrier 1 to move towards the second lateral side. The first supersonic detector 113 detects the forward distance between the moving carrier 1 and the user so that the control module 10 is able to maintain a constant distance between the user and the moving carrier 1.

The first supersonic detector 113 can also detect whether there is an obstacle or barrier in front of the moving carrier 1. When the first supersonic detector 113 is turned on and the moving carrier 1 is moving, the control module 10 determines that there is an obstacle or barrier ahead if a feedback signal from the first supersonic detector 113 is blocked by the obstacle or barrier, and instructs the driving unit 12 to stop or brake the moving carrier 1.

The first and second IR receivers 111 and 112 can be configured inside a tubular body of the frame 11. Corresponding to the positions of the first and second IR receivers 111 and 112, the tubular body has openings of a pre-determined aperture. These openings limit the reception coverage (angles) of the first and second IR receivers 111 and 112, respectively, as shown by the dashed lines in FIGS. 3 and 4. Additionally, the tubular body also provides concealment and protection to the first and second IR receivers 111 and 112.

As described above, when a user is in front of the moving carrier 1, the first and second IR receivers 111 and 112, and the first supersonic detector 113 provide lateral movement and forward distance detection, so that the moving carrier 1 automatically follows the user at a constant distance behind as the user moves straight ahead, or turns left or right.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A forward tracking system, comprising a moving carrier and a remote control device, wherein the moving carrier comprises a control device, a frame, and at least a driving device;

the control device is configured inside the moving carrier;

the frame is configured on the moving carrier with a first IR (infra-red) receiver configured adjacent to a first lateral side, a second IR receiver configured adjacent to a second lateral side, and a first supersonic detector configured between the first and second IR receivers on the frame;

the first and second IR receivers, and the first supersonic detector are electrically connected with the control device;

the driving device is configured in the moving carrier and electrically connected with the control device;

the control device directs the driving device to move forward, to turn to the first lateral side, or to turn to the second lateral side; and the remote control device comprises at least an IR transmitter signally linked with the first and second IR receivers.

2. The forward tracking system according to claim 1, wherein the control device operates in one of an automatic mode and a manual mode.

3. The forward tracking system according to claim 2, wherein the automatic mode is further configured to be a forward tracking mode, or an ON/STOP mode to toggle between an ON or STOP state of the moving carrier.

4. The forward tracking system according to claim 1, wherein the remote control device further comprises at least a forward tracking button, a toggle button, and a plurality of direction control buttons;
    the remote control device and the control device are configured with an identification code; and, after an authentication process based on the identification code between the remote control device and the control device is successfully finished, the IR transmitter of the remote control device is signally linked to the first and second IR receivers.

5. The forward tracking system according to claim 1, wherein the moving carrier further comprises at least a battery providing the required electricity to the driving device and the control device.

6. A control method for a forward tracking system, comprising the steps of:
    setting a control device of a moving carrier of the forward tracking system to operate in an automatic mode or in a manual mode;
    if the automatic mode is set, setting the control device to operate in a forward tracking mode or an ON/STOP mode to toggle between an ON or STOP state of the moving carrier; and
    if the forward tracking mode is set, activating a first IR receiver, a second IR receiver, and a first supersonic detector on a frame of the moving carrier, where, for a user straight ahead the moving carrier, the first and second IR receivers detect the user's left and right moving directions whereas the first supersonic detector detects a forward distance between the user and the moving carrier, and, as such, the control device automatically control the moving carrier to follow the user at a constant distance behind.

7. The control method according to claim 6, wherein, when the forward tracking mode is set, the user carries a remote control device of the forward tracking system and moves ahead of the moving carrier; an IR transmitter of the remote control device emits an IR signal; if the IR signal is received by both the first and second IR receivers, the control device determines that the user is moving straight ahead the moving carrier, and instructs a driving device of the moving carrier to drive the moving carrier to move straight ahead; when the user turns to a first lateral side, the second IR receiver does not receive the IR signal from the IR transmitter and the control device determines that the user has turned to the first lateral side, and instructs the driving device to drive the moving carrier to move towards the first lateral side; when the user turns to a second lateral side, the first IR receiver does not receive the IR signal from the IR transmitter and the control device determines that the user has turned to the second lateral side, and instructs the driving device to drive the moving carrier to move towards the second lateral side.

8. The control method according to claim 6, wherein, when the forward tracking mode is set, the first supersonic detector detects a forward distance between the moving carrier and the user so that the control device maintain a constant distance between the user and the moving carrier.

9. The control method according to claim 6, wherein, when the manual mode is set, the first supersonic detector detects whether there is an obstacle or barrier in front of the moving carrier.

\* \* \* \* \*